United States Patent
Watanabe et al.

(10) Patent No.: US 10,105,842 B2
(45) Date of Patent: Oct. 23, 2018

(54) OPERATION PROGRAM CREATING METHOD AND CONTROL METHOD OF ROBOT

(71) Applicant: KAWASAKI JUKOGYO KABUSHIKI KAISHA, Kobe-shi, Hyogo (JP)

(72) Inventors: Masayuki Watanabe, Kobe (JP); Takayuki Yoshimura, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 229 days.

(21) Appl. No.: 15/108,334

(22) PCT Filed: Dec. 22, 2014

(86) PCT No.: PCT/JP2014/006382
§ 371 (c)(1),
(2) Date: Jun. 27, 2016

(87) PCT Pub. No.: WO2015/098085
PCT Pub. Date: Jul. 2, 2015

(65) Prior Publication Data
US 2016/0325431 A1    Nov. 10, 2016

(30) Foreign Application Priority Data
Dec. 25, 2013  (JP) ................. 2013-267755

(51) Int. Cl.
B25J 9/16    (2006.01)
G05B 19/42   (2006.01)

(52) U.S. Cl.
CPC ............ B25J 9/163 (2013.01); B25J 9/1656 (2013.01); B25J 9/1664 (2013.01); G05B 19/42 (2013.01);
(Continued)

(58) Field of Classification Search
CPC ........ B25J 9/163; B25J 9/1656; B25J 9/1664; B25J 9/1651; G05B 19/42;
(Continued)

(56) References Cited

U.S. PATENT DOCUMENTS

| 4,529,921 A * | 7/1985 | Moribe | G05B 19/425 |
| | | | 318/567 |
| 5,020,001 A * | 5/1991 | Yamamoto | G05B 19/4086 |
| | | | 700/189 |

(Continued)

FOREIGN PATENT DOCUMENTS

| JP | H06-348332 A | 12/1994 |
| JP | H10-39917 A | 2/1998 |

(Continued)

OTHER PUBLICATIONS

Jun. 28, 2016 International Preliminary Report on Patentability issued in International Patent Application No. PCT/JP2014/006382.

(Continued)

*Primary Examiner* — Bao Long T Nguyen
(74) *Attorney, Agent, or Firm* — Oliff PLC (57) ABSTRACT

An operation program creating method comprises performing, with a computer, a speed setting step that creates an operation program of a robot in such a manner that speeds at a plurality of teaching points are set, and in the speed setting step, the speed at a specified teaching point on the designed movement path is set based on a position change or a posture change in a plurality of teaching points including the specified teaching point, a teaching point which is upstream of the specified teaching point on the designed movement path, and/or a teaching point which is downstream of the specified teaching point on the designed movement path.

6 Claims, 6 Drawing Sheets

(52) U.S. Cl.
CPC ... *G05B 2219/40449* (2013.01); *Y10S 901/03* (2013.01)

(58) Field of Classification Search
CPC .......... G05B 2219/40449; G05B 19/19; G05B 19/416; G05B 2219/40523; Y10S 901/03
USPC ......... 700/253, 250, 188; 901/3; 318/568.17
See application file for complete search history.

(56) References Cited

U.S. PATENT DOCUMENTS

| | | | | |
|---|---|---|---|---|
| 5,646,493 | A | * | 7/1997 | Hara ................ B25J 9/1684 318/568.17 |
| 5,993,044 | A | * | 11/1999 | Ohto ................ G06F 17/17 219/124.34 |
| 2012/0296471 | A1 | * | 11/2012 | Inaba ................ B25J 9/163 700/253 |
| 2013/0263639 | A1 | * | 10/2013 | Nonomura ............ B21D 22/18 72/352 |
| 2013/0317646 | A1 | * | 11/2013 | Kimoto .............. B25J 9/1651 700/250 |

FOREIGN PATENT DOCUMENTS

| | | |
|---|---|---|
| JP | H10-69310 A | 3/1998 |
| JP | H10-301616 A | 11/1998 |
| JP | H11-104982 A | 4/1999 |
| JP | 2011-41992 A | 3/2011 |
| JP | 2013-059852 A | 4/2013 |
| JP | 2013-215753 A | 10/2013 |

OTHER PUBLICATIONS

Feb. 17, 2015 International Search Report issued in International Patent Application No. PCT/JP2014/006382.
Aug. 14, 2017 Extended European Search Report issued in European Patent Application No. 14875707.3.

* cited by examiner

Speed setting table

| Inner angle θ | Speed |
|---|---|
| 50.00— | 600.00 |
| 32.00~45.00 | 500.00 |
| 20.00~32.00 | 400.00 |
| 10.00~20.00 | 300.00 |
| —10.00 | 200.00 |

OPERATION PROGRAM CREATING METHOD AND CONTROL METHOD OF ROBOT

TECHNICAL FIELD

The present invention relates to an operation program creating method, and a control method of a robot.

BACKGROUND ART

It is known that in a robot including a work (operation) section which performs works (operations) and a link section which moves the work section with respect to a base, the position and posture of the tip end of the work section are taught off-line. In a case where there is a great position change between adjacent teaching points in a teaching order, or there is a great posture change in the work section between the adjacent teaching points, the tip end of the work section may sometimes fail to reach the teaching point instructed, when the robot is actually moved. In particular, in a case where a distance (interval) between the adjacent teaching points is short and a case where there is a great position change or a great posture change in the robot between the adjacent teaching points, the control for the robot cannot be performed well. This degrades a position accuracy.

As a processing method using the robot, it is known that a workpiece is processed in such a manner that a processing tool is attached to the tip end of a work section of a robot, and the tip end of the work section of the robot is moved relatively to the workpiece in a state in which the processing tool is pressed against the workpiece (e.g., Patent Literature 1, or the like). In this configuration, the degradation of the position accuracy is directly linked to the degradation of a processing accuracy, which is undesirable.

In contrast, in order to avoid an excessive load from being imposed on a robot, due to a rapid change in the posture of the robot, for example, Patent Literature 2 discloses a method which processes data of teaching points which are input to a control device in order to smooth the posture of the robot.

CITATION LIST

Patent Literature

Patent Literature 1: Japanese Laid-Open Patent Application Publication No. 2011-41992
Patent Literature 2: Japanese Laid-Open Patent Application Publication No. Hei. 6-348322

SUMMARY OF INVENTION

Technical Problem

However, if the data of the teaching points is processed as in the method of Patent Literature 2, the track of the position of the tip end of the work section is varied. This makes it difficult to perform position control with a high accuracy.

The present invention has been made to solve the above-described problem, and an object of the present invention is to provide an operation program creating method and a control method of a robot, for a robot device which can improve an accuracy with which the robot is positioned at a teaching point (command value).

Solution to Problem

According to an aspect of the present invention, an operation program creating method for creating an operation program for a robot device including: a robot including a work section for performing a work and a link section for moving the work section with respect to a base; and a control device configured to control the robot based on the operation program of the robot, the operation program including a plurality of teaching points defining a designed movement path of the work section, postures of the work section at the plurality of teaching points, and speeds of the work section at the plurality of teaching points, comprises performing, with a computer, a speed setting step that creates the operation program of the robot in such a manner that the speeds at the plurality of teaching points are set, wherein in the speed setting step, the speed at a specified teaching point on the designed movement path is set based on a position change or a posture change in the plurality of teaching points including the specified teaching point, a teaching point which is upstream of the specified teaching point on the designed movement path, and/or a teaching point which is downstream of the specified teaching point on the designed movement path.

In accordance with this method, the speed at the specified teaching point is set based on the position change or the posture change with respect to the teaching point which is upstream of the specified teaching point on the designed movement path of the work section, and/or the teaching point which is downstream of the specified teaching point on the designed movement path. This makes it possible to increase an accuracy with which the work section is positioned at the teaching point (command value) when the work section is actually moved.

The speed setting step may include a speed reducing step that sets the speed at the specified teaching point to a value which is made smaller when at least one of a first condition and a second condition is met than when the first condition and the second condition are not met, the first condition being a condition in which a value of an inner angle formed by line segments connecting three teaching points including the specified teaching point on the designed movement path, the teaching point which is upstream of the specified teaching point on the designed movement path, and the teaching point which is downstream of the specified teaching point on the designed movement path is equal to or less than a predetermined value, and the second condition being a condition in which a value of an angular change in a posture of the work section between the specified teaching point on the designed movement path, and the teaching point which is upstream of the specified teaching point on the designed movement path is equal to or greater than a predetermined value. In accordance with this method, in a case where the angle formed by the line segment extending from the teaching point which is upstream of the teaching point for which the speed is to be set to the teaching point for which the speed is to be set on the designed movement path, and the line segment extending from the teaching point for which the speed is to be set to the teaching point which is downstream of the teaching point for which the speed is to be set on the designed movement path is greater, the speed is reduced (set to a smaller value). Or, in a case where the posture of the teaching point for which the speed is to be set is significantly changed from the posture of the robot at the teaching point which is upstream of the teaching point for which the speed is to be set on the designed movement path, the speed is reduced. This makes it possible to position the work section of the robot at the teaching point (command value) with a higher accuracy when the work section is actually moved.

In the speed setting step, the speed at the specified teaching point may be set to a value which is made smaller in such a manner that the value is gradually reduced from a position which is upstream at a predetermined distance from the specified teaching point. In accordance with this method, a speed change in the robot can be made gradual, and the robot can move smoothly.

In the speed setting step, the speed at the specified teaching point may be set to a value which is made smaller in such a manner that the speed at the specified teaching point is maintained as a speed on a path from the specified teaching point toward a subsequent teaching point, in a range from the specified teaching point to a position which is downstream at a predetermined distance from the specified teaching point. In accordance with this method, the work section of the robot can reach the teaching point with a higher accuracy. In addition, the speed change in the robot can be made gradual, and the robot can move smoothly.

In the speed setting step, at least one teaching point may be selected from among the plurality of teaching points, and the speed is set for the selected at least one teaching point. In accordance with this method, the teaching points with a lesser change (e.g., teaching points on a straight line), of the plurality of teaching points, can be eliminated, and the teaching points with a greater change can be adopted. Since the teaching points effectively used as command positions can be reduced, operation time can be reduced.

The control device of the robot device may be configured to control the robot to cause the robot to perform incremental forming for processing workpieces in such a manner that a rod-like tool attached to the work section of the robot is pressed against the workpieces in succession. In incremental forming, a higher processing accuracy is required. For this reason, there is tendency that there are numerous teaching points and an interval between the teaching points in a teaching order is short. Under the circumstances, by creating the operation program based on the above-described operation program creating method in the incremental forming, the robot can operate with a higher accuracy, and hence a higher processing accuracy can be realized. In addition, processing for forming a more complex shape can be realized.

According to another aspect of the present invention, a control method of a robot comprises controlling the robot based on the operation program created by the above-described operation program creating method. In accordance with this method, the work section can be positioned at the teaching point (command value) with a higher accuracy when the work section is actually moved.

The above and further objects, features and advantages of the present invention will more fully be apparent from the following detailed description of a preferred embodiment with reference to the accompanying drawings.

Advantageous Effects of Invention

The present invention is configured as described above, and can obtain an advantage in that the work section of the robot can be positioned at the teaching point (command value) with a higher accuracy.

DESCRIPTION OF EMBODIMENTS

Hereinafter, the embodiment of the present invention will be described with reference to the accompany drawings. Throughout the drawings, the same or corresponding components are designated by the same reference characters, and repeated description thereof will not be given.

Figure 1:
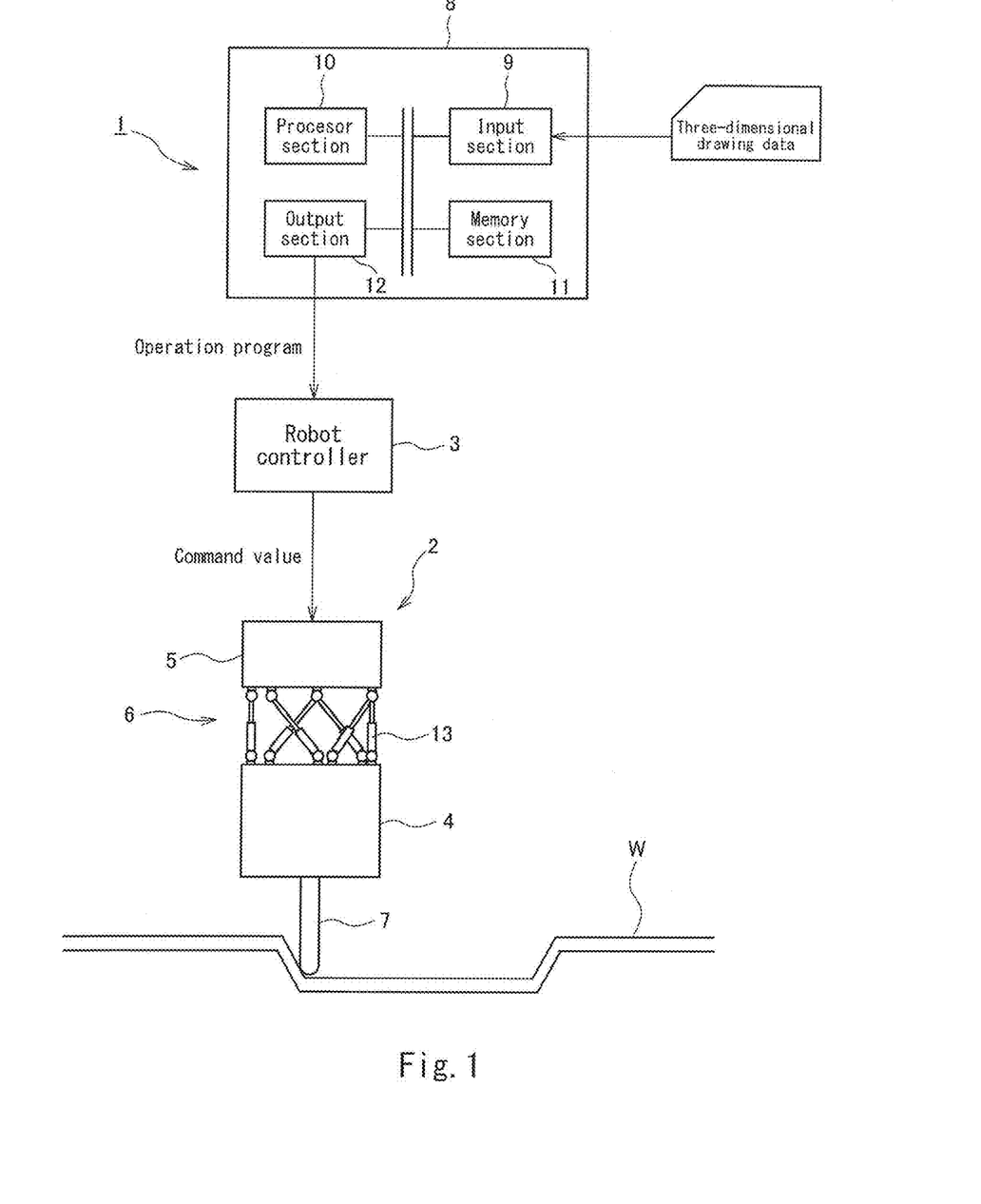
FIG. 1 is a diagram schematically showing the configuration of a robot device including a computer terminal to which an operation program creating method according to the embodiment of the present invention is applied.

FIG. 1 is a diagram schematically showing the configuration of a robot device including a computer terminal to which an operation program creating method according to the embodiment of the present invention is applied. As shown in FIG. 1, a robot device 1 according to the present embodiment includes a robot 2, and a robot controller 3 which is a control device for the robot 2. An operation program of the robot 2 is input to the robot controller 3 and stored therein. The robot controller 3 calculates a command value for the robot 2 based on the operation program, and outputs the command value to the robot 2 to control the robot 2.

The robot 2 includes a work (operation) section 4 which performs works (operations), and a link section 6 which moves the work section 4 with respect to a base 5. A rod-like tool 7 which is a processing tool is detachably attached to the tip end of the work section 4 of the robot 2. The link section 6 is configured as, for example, a stewart platform including a parallel combination of a plurality of (e.g., six) extendable/contractible link members 13. Each of the extendable/contractible link members 13 is configured to extend or contract its body to vary a link length. The extendable/contractible link members 13 are connected to the base 5 and the work section 4 via universal joints, ball joints, etc. In this configuration, the robot 2 extends or contracts each of the extendable/contractible link members 13, to thereby change the posture of the work section 4 or move the position of the tip end of the work section 4 relatively to a workpiece W.

The robot device 1 is configured to control the robot 2 to process (incremental forming for) the workpiece W by moving the tip end of the work section 4 of the robot 2 relatively to the workpiece W in a state in which the tip end of the rod-like tool 7 is pressed against the workpiece W. In brief, the robot device 1 of the present embodiment is configured as a robot device which performs the incremental forming.

Figure 2:
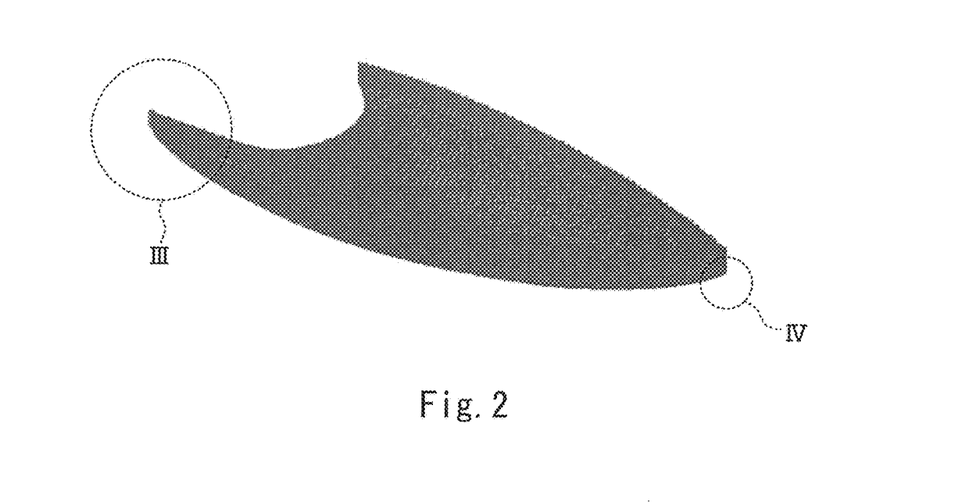
FIG. 2 is a view showing exemplary three-dimensional drawing data input to the computer terminal of FIG. 1.
Figure 3:
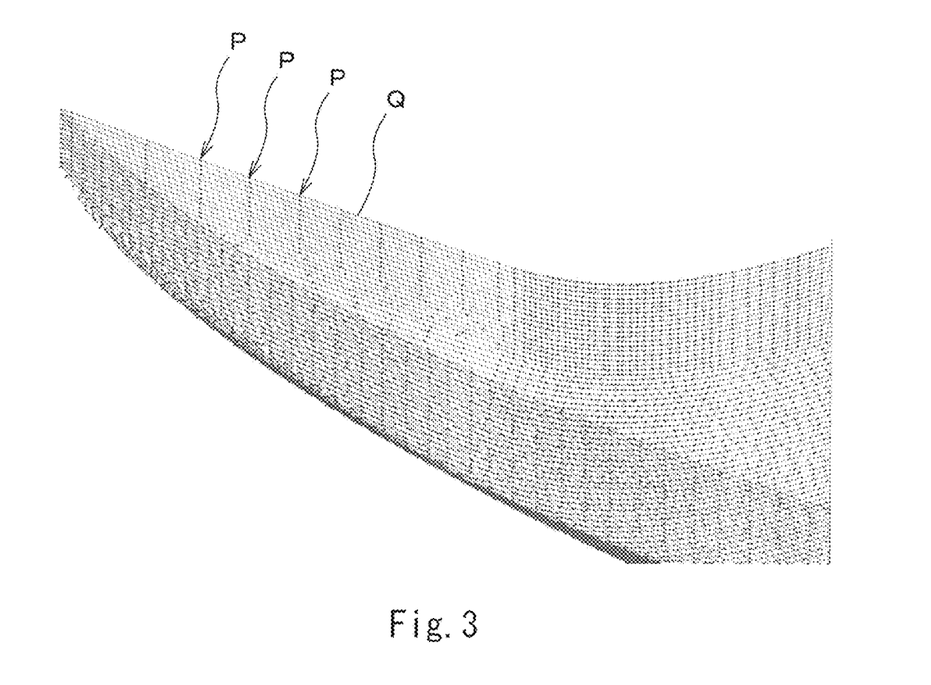
FIG. 3 is an enlarged view showing a region that is in the vicinity of part III of the three-dimensional drawing data of FIG. 2.

The operation program is created from three-dimensional drawing data drawn by a three-dimensional drawing program such as a 3D-CAD. Teaching points and a variety of codes for robot processing are preliminarily provided to the three-dimensional drawing data by a CAM device or a CAM program based on a design drawing created by a CAD, or the like. FIG. 2 is a view showing exemplary three-dimensional drawing data input to the computer terminal of FIG. 1. FIG. 3 is an enlarged view showing a region that is in the vicinity of part III of the three-dimensional drawing data of FIG. 2. FIGS. 2 and 3 show three-dimensional drawing data used to form a shape of, for example, a recessed region (region into which a hand gripping a handle is put) or the like of a handle unit of a door panel of an automobile. FIGS. 2 and 3 show a designed movement path Q along which the tip end portion of the work section 4 moves on many teaching points P in succession.

The computer terminal 8 which creates the operation program includes an input section 9 which receives the three-dimensional drawing data as an input, a processor section 10 such as a CPU which performs calculations (computations) based on the input three-dimensional drawing data, a memory section 11 such as a RAM or an external memory which stores calculated data therein, and an output section 12 which outputs the created operation program. The output section 12 of the computer terminal 8 and the robot controller 3 may be communicatively connected to each other via a wire or in a wireless manner. In an alternative configuration, the output section 12 of the computer terminal 8 may output the operation program to a specified storage medium (not shown), the operation program may be stored in the specified storage medium, and the specified storage medium containing the operation program may be connected to the robot controller 3 so that the robot controller 3 can read out the operation program.

The operation program includes a plurality of teaching points defining the designed movement path of the work section 4 of the robot 2, the postures of the work section 4 at the plurality of teaching points, and the speeds of the work section 4 at the plurality of teaching points. The plurality of teaching points include position coordinates in a predetermined coordinate system, at the tip end of the work section 4 of the robot 2. The postures of the work section 4 are indicated by the orientations of a tool coordinate system (OAT coordinate system). The computer terminal 8 which creates the operation program is configured to convert the coordinates of the teaching points indicated by the three-dimensional drawing data into the coordinate system of the robot, based on the three-dimensional drawing data, and applies a pre-patterned posture change in the work section 4 based on the movement path of the teaching points. In this way, the postures of the work section 4 at the teaching points are set. In addition to or instead of this, the postures of the work section 4 corresponding to the teaching points, respectively, may be manually input, for example.

Figure 4:
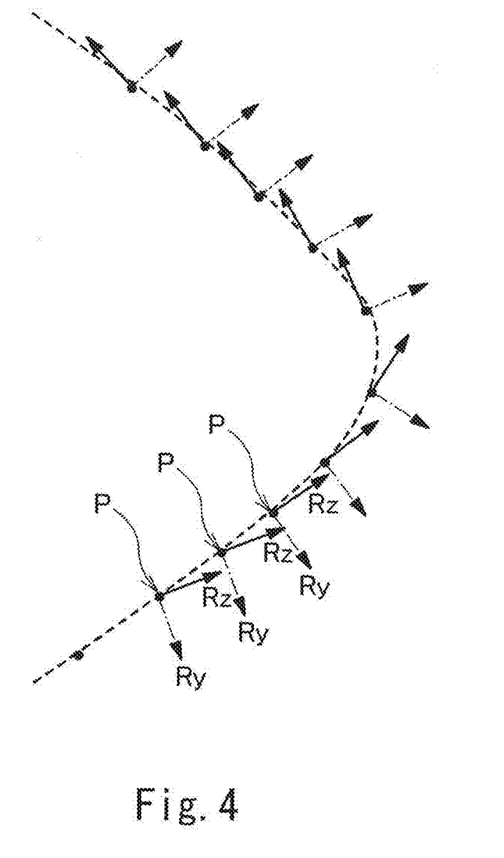
FIG. 4 is a view showing exemplary posture coordinates given to each of teaching points of the three-dimensional drawing data of FIG. 2.

FIG. 4 is a view showing exemplary posture coordinates given to each of teaching points of the three-dimensional drawing data of FIG. 2. FIG. 4 exemplarily shows the orientations of the posture coordinates on the teaching points which are in the vicinity of IV part of the three-dimensional drawing data of FIG. 2. FIG. 4 shows how the tool coordinate system (Cartesian coordinate system) set on the tip end portion of the work section 4 is set at the teaching points. In FIG. 4, Ry-axes (one-dotted line arrows) and Rz-axes (solid-line arrows) which are parallel to the drawing sheet of FIG. 4 are shown, while Rx-axes in which a direction perpendicular to the drawing sheet of FIG. 4 and toward the drawing sheet of FIG. 4 is positive are omitted.

The computer terminal 8 which creates the operation program executes a speed setting step that creates the operation program of the robot 2 in such a manner that the computer terminal 8 sets speeds at the plurality of teaching points based on the three-dimensional drawing data. In the speed setting step, the speed at a specified teaching point P on the designed movement path is set based on a position change or a posture change in a plurality of teaching points including the specified teaching point P on the designed movement path, a teaching point which is upstream of the teaching point P on the designed movement path and/or a teaching point which is downstream of the teaching point P on the designed movement path.

In accordance with the above-described method, the speed at the specified teaching point is set based on the position change or the posture change with respect to the teaching point which is upstream of the specified teaching point on the designed movement path of the work section, and/or the teaching point which is downstream of the specified teaching point on the designed movement path. This makes it possible to increase an accuracy with which the work section is positioned on the teaching point (command value) when the work section is actually moved.

Figure 5:
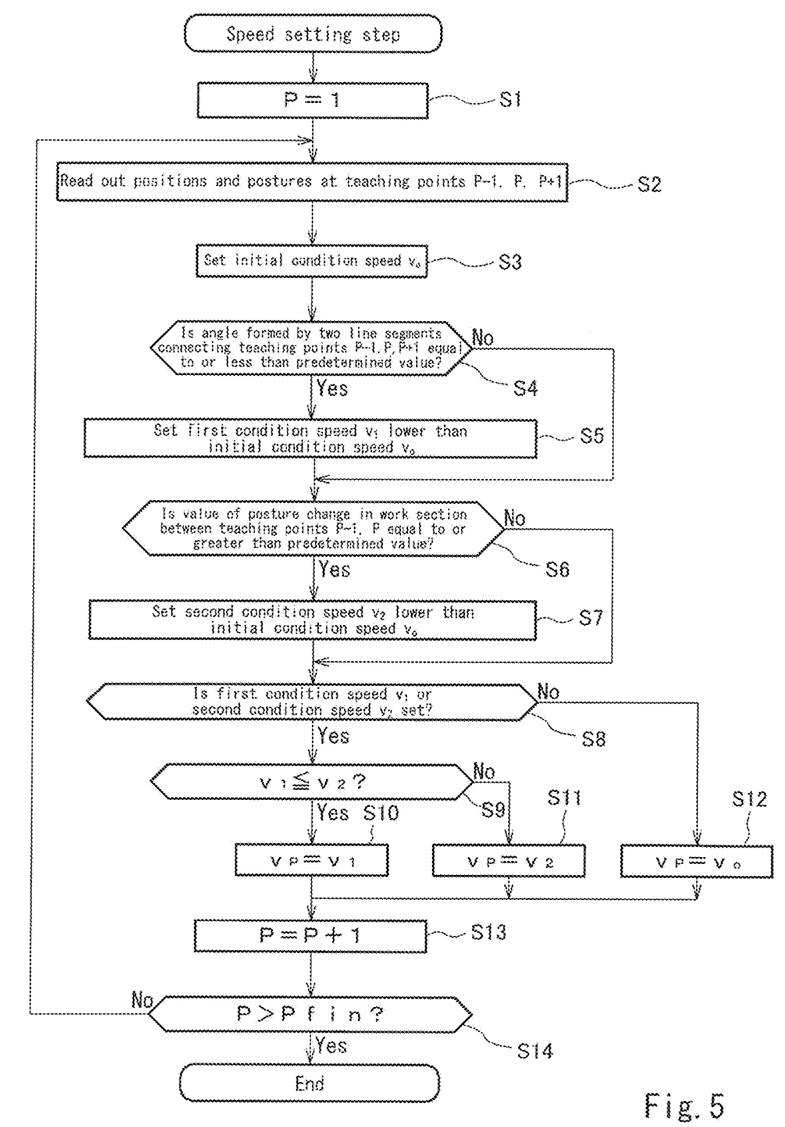
FIG. 5 is a flowchart showing a process flow of a speed setting step of an operation program applied to the robot device of FIG. 1.

Hereinafter, this will be described more specifically. FIG. 5 is a flowchart showing a process flow of the speed setting step of the operation program applied to the robot device of FIG. 1. Firstly, in initialization, the processor section 10 of the computer terminal 8 sets a flag P indicative of the number of the teaching point to an initial value 1 and stores it in the memory section 11 (step S1). Then, the processor section 10 reads out from the memory section 11 the teaching points corresponding to flags P−1, P, and P+1, and the positions and the postures at the teaching points (step S2). More specifically, the processor section 10 reads out the position and the posture at the specified teaching point P, the position and the posture at the teaching point P−1 which is upstream of the specified teaching point P, and the position and the posture at the teaching point P+1 which is downstream of the specified teaching point P. In the initial state (P=1), the processor section 10 also reads out information (position and posture of the work section 4) in an operation start state of the robot 2 as the teaching point P=0 (P−1).

Then, the processor section 10 sets the speed (hereinafter this will be referred to as an initial condition speed) $v_o$ of the work section 4 at the teaching point P based on a position change and a posture change from the read-out teaching point P−1 to the read-out teaching point P (step S3).

Further, the processor section 10 determines whether or not the read-out teaching points P−1, P, P+1 meet a first condition (step S4). The first condition is such that the value of an inner angle θ formed by line segments connecting the three teaching points P−1, P, P+1 including the specified teaching point P on the designed movement path, the teaching point P−1 which is upstream of the teaching point P on the designed movement path, and the teaching point P+1 which is downstream of the teaching point P on the designed movement path is equal to or less than a predetermined value. When the processor section 10 determines that the teaching points P−1, P, P+1 meet the first condition (Yes in step S4), the processor section 10 sets the speed of the work section 4 at the teaching point P to a value (hereinafter this will be referred to as a first condition speed $v_1$) smaller than the value of the initial condition speed $v_o$ (step S5).

Figure 6:
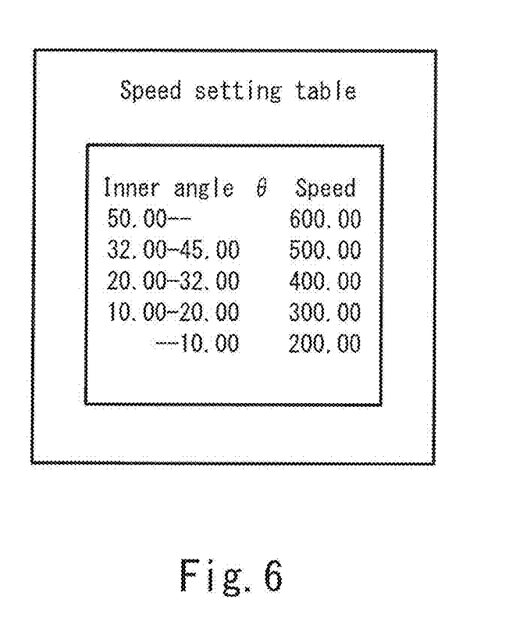
FIG. 6 is a diagram showing a speed setting table corresponding to a first condition according to the embodiment.

The first condition speed $v_1$ is defined based on the value of the inner angle θ formed by the line segments connecting the three teaching points P−1, P, P+1. Specifically, a speed setting table which contains the ranges of the inner angle θ and the corresponding speeds in such a manner that the ranges and the corresponding speeds are associated with each other is pre-stored in the memory section 11. The processor section 10 calculates the value of the inner angle θ formed by the line segments, reads out from the speed setting table the speed corresponding to the range into which the inner angle θ derived by the calculation falls, and sets the first condition speed $v_1$. FIG. 6 is a diagram showing the speed setting table corresponding to the first condition according to the embodiment. As can be seen from the speed setting table of FIG. 6, the value of the speed is smaller as the inner angle θ is smaller (more acute).

Further, the processor section 10 determines whether or not the read-out teaching points P−1, P meet a second condition (step S6). The second condition is such that the value of an angular change in the posture of the work section 4 between the specified teaching point P on the designed movement path and the teaching point P−1 which is upstream of the teaching point P on the designed movement path is equal to or greater than a predetermined value. For example, the value of the angular change in the posture may be set as the value of the angular change in the axis with a greatest angular change, among tool coordinate axes Rx, Ry, Rz between the two teaching points P−1, P, or as the value of the angular change in predetermined at least one of the tool coordinate axes Rx, Ry, Rz.

When the processor section 10 determines that the teaching points P−1, P meet the second condition (Yes in step S6), the processor section 10 sets the speed of the work section 4 at the teaching point P to a value (hereinafter this will be referred to as a second condition speed $v_2$) which is smaller than the value of the initial condition speed $v_o$ (step S7). The second condition speed $v_2$ is defined based on the magnitude of the posture change in the work section 4 between the two teaching points P−1, P. As in the case of the speed setting table (see FIG. 6) for the first condition speed $v_1$, a speed setting table for the second condition speed $v_2$ which contains the ranges of the angular change in the posture and the corresponding speeds in such a manner that the ranges and the corresponding speeds are associated with each other is pre-stored in the memory section 11. The processor section 10 calculates the value of the angular change in the posture, reads out from the speed setting table the speed corresponding to the range in which the angular change in the posture which is derived by the calculation falls, and sets the second condition speed $v_2$.

The processor section 10 sets the lowest speed of the calculated speeds, as a speed $v_p$ at the teaching point P (step S8 to step S12). Specifically, the processor section 10 determines whether or not the first condition speed $v_1$ and/or the second condition speed $v_2$ is/are set (step S8). When the processor section 10 determines that the first condition speed $v_1$ and/or the second condition speed $v_2$ is/are set (Yes in step S8), the processor section 10 determines which of the first condition speed $v_1$ and the second condition speed $v_2$ is lower (step S9). The processor section 10 sets the lower speed of the first condition speed $v_1$ and the second condition speed $v_2$, as the speed $v_p$ at the teaching point P.

Specifically, when the processor section 10 determines that the first condition speed $v_1$ is equal to or lower than the second condition speed $v_2$ (Yes in step S9), the processor section 10 sets the first condition speed $v_1$ as the speed $v_p$ at the teaching point P (step S10). On the other hand, when the processor section 10 determines that the first condition speed $v_1$ is higher than the second condition speed $v_2$ (No in step S9), the processor section 10 sets the second condition speed $v_2$ as the speed at the teaching point P (step S11). In a case where the processor section 10 calculates only one of the first condition speed $v_1$ and the second condition speed $v_2$, the processor section 10 sets the calculated condition speed as the speed $v_p$ at the teaching point P. For example, regarding the condition speed which is not calculated, the initial condition speed $v_o$ may be set. Specifically, when the teaching points P−1, P, P+1 do not meet the first condition (No in step S4), the processor section 10 sets the initial condition speed $v_o$ as the first condition speed $v_1$. Likewise, when the teaching points P−1, P do not meet the second condition (No in step S6), the processor section 10 sets the initial condition speed $v_o$ as the second condition speed $v_2$.

In a case where the processor section 10 does not calculate the first condition speed $v_1$ and the second condition speed $v_2$ (No in step S4 and No in step S6), the processor section 10 sets the initial condition speed $v_o$ as the speed $v_p$ at the teaching point P (step S12).

As described above, the speed setting step includes a speed reducing step that sets the speed $v_p$ at the specified teaching point P to a value which is made smaller, when the relationship between the specified teaching point P, the teaching point P−1 which is upstream of the teaching point P and/or the teaching point P+1 which is downstream of the teaching point P meets at least one of the first and second conditions than when the relationship does not meet the first and second conditions (the initial condition speed $v_o$).

After the speed $v_p$ at the teaching point P has been set, the processor section 10 adds 1 to the flag P (P=P+1), and stores P+1 in the memory section 11 (step S13). The processor section 10 determines whether or not the flag P has reached Pfin indicative of a final teaching point in the operation of one cycle of the robot 2 (step S14). When the processor section 10 determines that the flag P has exceeded Pfin (Yes in step S14), the processor section 10 determines that the speeds $v_p$ at all of the teaching points P have been set, and terminates the process. On the other hand, when the processor section 10 determines that the flag P is equal to or less than Pfin (No in step S14), the processor section 10 sets a speed $v_p$ at a new teaching point P (P+1) based on three teaching points including the new teaching point P for which the speed is to be set (step S2 to step S12).

In accordance with the above-described configuration, in a case where the angle (inner angle) θ formed by the line segment extending from the teaching point P−1 which is upstream of the teaching point P for which the speed is to be set to the teaching point P on the designed movement path, and the line segment extending from the teaching point P to the teaching point P+1 which is downstream of the teaching point P on the designed movement path is greater, the speed $v_p$ is reduced to the first condition speed $v_1$. Or, in a case where the posture of the teaching point P for which the speed $v_p$ is to be set is significantly changed from the posture of the robot 2 at the teaching point P−1 which is upstream of the teaching point P on the designed movement path, the speed $v_p$ is reduced to the second condition speed $v_2$. This makes it possible to position the work section 4 at the teaching point (command value) with a higher accuracy when the work section 4 is actually moved. In particular, in the incremental forming, a higher processing accuracy is required. For this reason, there is tendency that there are numerous teaching points (e.g., in some cases, there are several tens of thousands of teaching points in the process of one cycle) and an interval between the teaching points in a teaching order is short (e.g., the interval is about 0.3 mm). Under the circumstances, by creating the operation program based on the above-described operation program creating method in the incremental forming, the robot 2 can operate with a higher accuracy, and hence a higher processing accuracy can be realized. In addition, processing for forming a more complex shape can be realized.

In a case where the speed $v_p$ at the specified teaching point P is set to a smaller value in the speed setting step, namely, the speed reducing step for the speed $v_p$ at the teaching point P is performed, a speed control in a range from the teaching point P−1 which is upstream of the teaching point P to the teaching point P and/or a speed control in a range from the teaching point P to the teaching point P+1 which is downstream of the teaching point P can be made different from a normal state control.

Figure 7:
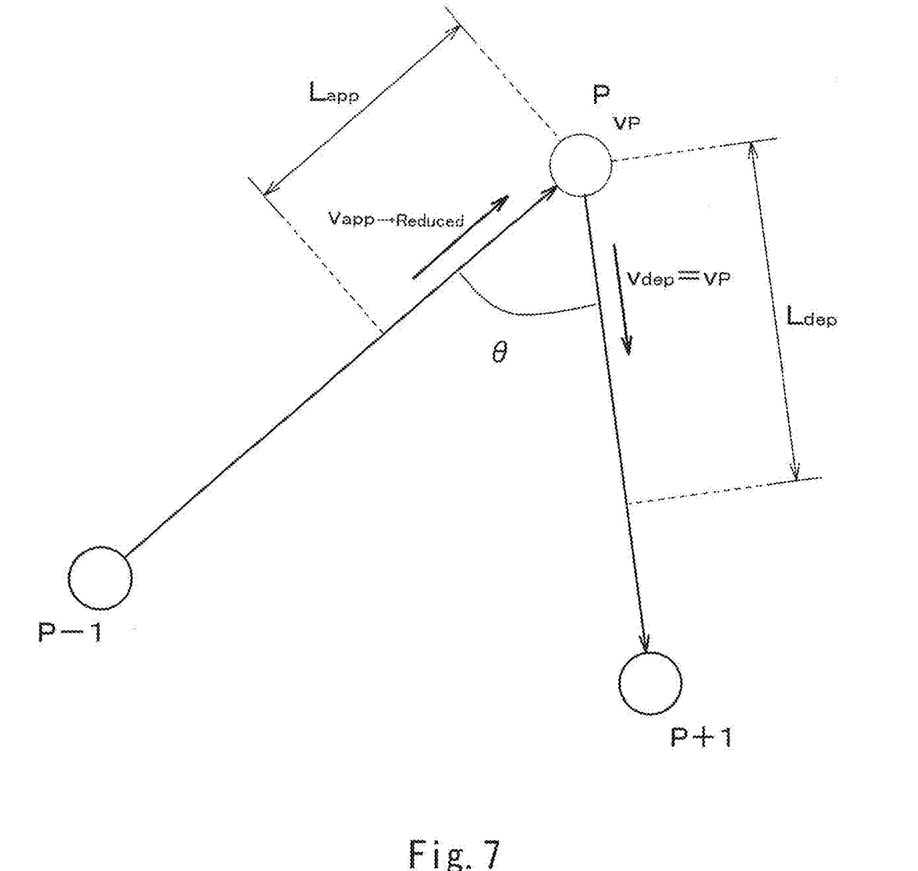
FIG. 7 is a diagram schematically showing three teaching points which are successive over time.

FIG. 7 is a diagram schematically showing three teaching points which are successive over time. As shown in FIG. 7, the processor section 10 sets the speed $v_p$ at the specified teaching point P to a smaller value (the first condition speed $v_1$ or the second condition speed $v_2$) in the speed setting step in such a manner that a speed $v_{app}$ on a path leading to the teaching point P is gradually reduced, starting from a position which is upstream at a distance $L_{app}$ from the teaching point P. A reduction rate of the speed $v_{app}$ may be set based on the speed $v_p$ at the teaching point P. Thus, a speed change in the robot 2 can be made gradual, and the robot 2 can move smoothly. In a case where a distance between the teaching point P and the teaching point P−1 which is upstream of the teaching point P is shorter than the distance $L_{app}$, the speed may be set to be gradually reduced from a speed $v_{P-1}$ at the teaching point P−1 which is upstream of the teaching point P to the speed $v_p$ at the teaching point P.

Further, the processor section 10 maintains the speed $v_p$ at the teaching point P as a speed $v_{dep}$ on a path from the teaching point P toward the following teaching point P+1 (namely $v_{dep}=v_p$), in a range from the teaching point P to a position which is downstream at a predetermined distance $L_{dep}$ from the teaching point P. This allows the work section 4 to reach the teaching point P with a higher accuracy. In addition, the speed change in the robot 2 can be made gradual and hence the robot 2 can move smoothly. In a case where a distance between the teaching point P and the teaching point P+1 which is downstream of the teaching point P is shorter than the distance $L_{dep}$, the processor section 10 may make the speed $v_{P+1}$ at the teaching point P+1 which is downstream of the teaching point P equal to the speed $v_p$ at the teaching point P (the robot 2 operates at an equal speed between the teaching point P and the teaching point P+1).

Although each of the distance $L_{app}$ and the distance $L_{dep}$ may be set to a constant distance as described above, each of the distance $L_{app}$ and the distance $L_{dep}$ may be alternatively set as a ratio with respect to the distance between the two teaching points. For example, the robot 2 may be controlled in such a manner that the speed is gradually reduced from a point that is a half of a distance $L_{p-1, p}$ between the teaching point P and the teaching point P−1 which is upstream of the teaching point P. In brief, the distance $L_{app}$ may be set as $L_{app}=L_{p-1, p}/2$. Further, for example, the robot 2 may be controlled in such a manner that the speed is maintained in a range from the teaching point P to a point that is one third of a distance $L_{p, p+1}$ between the teaching point P and the teaching point P+1 which is downstream of the teaching point P. In brief, the distance $L_{dep}$ may be set as $L_{dep}=L_{p, p+1}/3$.

It should be noted that the speed setting step need not be performed for all of the teaching points included in the three-dimensional drawing data. For example, the speed setting step may not be performed for the teaching point with a lesser speed change, such as a straight-line portion. In this case, in the speed setting step, at least one teaching point is selected from among the plurality of teaching points included in the three-dimensional drawing data. The processor section 10 sets the speed for the at least one teaching point selected. Thus, the teaching points with a lesser change (e.g., teaching points on a straight line), of the plurality of teaching points, can be eliminated, and the teaching points with a greater change can be adopted. Since the teaching points effectively used as command positions can be reduced, operation time can be reduced.

The teaching points for which the speed is to be set may be selected in such a manner that an operator selects the teaching points one by one as desired or specify a range of a predetermined region such as a straight-line region, and the speed may not be set for the teaching points lying in the specified range. Further, the range may be specified in the same manner, and only particular teaching points located at equal intervals in the specified range may be treated as the teaching points (e.g., one of consecutive ten points is specified as the teaching point for which the speed is to be set and the remaining nine points are specified as points for which the speed is not to be set).

In a case where the teaching points are selected as described above, the teaching points P−1, P, P+1 which are successive over time in the flowchart of the speed setting step of FIG. 5 are not always the three teaching points which are successive on the three-dimensional drawing data. Specifically, it is supposed that among the plurality of teaching points on the three-dimensional drawing data, there exists a teaching point between a specified teaching point for which the speed is to be set, and a teaching point which is used in the speed reducing step and is upstream of the specified teaching point, and/or a teaching point which is used in the speed reducing step and is downstream of the specified teaching point. Further, the speed may not necessarily be set for the teaching points P−1, P+1 used in the conditions in the speed setting steps. For example, the processor section 10 may set the speed for the teaching point present at every interval of a predetermined number of teaching points, while the processor section 10 may determine whether or not to perform the speed reducing step by use of the specified teaching point for which the speed is to be set, the teaching point which is upstream of and adjacent to the specified teaching point, and/or the teaching point which is downstream of and adjacent to the specified teaching point (the speed is not set for the upstream teaching point and downstream teaching point) (step S4, step S6).

Although the embodiment of the present invention has been described above, the present invention is not limited to the above-described embodiment, and may be improved, changed or modified within the scope of the invention.

For example, although in the above-described embodiment, the robot used for the incremental forming and including the link section 6 configured as the stewart platform is exemplarily described as the robot 2 to which the present invention is applied, the present invention is not limited to this. The present invention is applicable to a variety of robots each including a work section which performs a work, and a link section which moves the work section with respect to a base. For example, the present invention is applicable to a multi-joint robot including a plurality of arm members and a plurality of joints (rotational axes) connecting the arm members to each other.

In the above-described embodiment, the processor section 10 determines whether or not the teaching points meet the first condition (step S4) and the second condition (step S6), performs the speed reducing step if the teaching points meet at least one of the first and second conditions, and uses the lower speed of the first condition speed $v_1$ and the second condition speed $v_2$ if the teaching points meet both of the first and second conditions. However, the present invention is not limited to this. For example, the processor section 10 may determine whether or not the teaching points meet only one of the first and second conditions. Further, for example, the processor section 10 may determine whether or not the teaching points meet the second condition if the teaching points do not meet the first condition, or may not determine whether or not the teaching points meet the second condition if the teaching points meet the first condition. Moreover, the first condition and the second condition may be reversed.

Numerous improvements and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

An operation program creating method and a control method of a robot of the present invention are effectively used to position a robot at a teaching point (command value) with a high accuracy.

REFERENCE SIGNS LIST 1 robot device
2 robot
3 robot controller (control device)
4 work section
5 base
6 link section
7 rod-like tool
8 computer terminal
9 input section
10 processor section
11 memory section
12 output section
W workpiece

The invention claimed is:

1. An operation program creating method for creating an operation program for a robot device including:
a robot including a work section for performing a work and a link section for moving the work section with respect to a base; and
a control device configured to control the robot based on the operation program of the robot, the operation program including a plurality of teaching points defining a designed movement path of the work section, postures of the work section at the plurality of teaching points, and speeds of the work section at the plurality of teaching points, the operation program creating method comprising:
performing, with a computer, a speed setting step that creates the operation program of the robot in such a manner that the speeds at the plurality of teaching points are set, wherein
in the speed setting step, the speed at a specified teaching point on the designed movement path is set based on a position change or a posture change in the plurality of teaching points including the specified teaching point, a teaching point which is upstream of the specified teaching point on the designed movement path, and/or a teaching point which is downstream of the specified teaching point on the designed movement path,
the speed setting step includes a speed reducing step that sets the speed at the specified teaching point to a value which is made smaller, when at least one of a first condition and a second condition is met than when the first condition and the second condition are not met,
the first condition being a condition in which a value of an inner angle formed by line segments connecting three teaching points including the specified teaching point on the designed movement path, the teaching point which is upstream of the specified teaching point on the designed movement path, and the teaching point which is downstream of the specified teaching point on the designed movement path is equal to or less than a predetermined value, and
the second condition being a condition in which a value of an angular change in a posture of the work section between the specified teaching point on the designed movement path, and the teaching point which is upstream of the specified teaching point on the designed movement path is equal to or greater than a predetermined value.

2. The operation program creating method according to claim 1,
wherein in the speed setting step, the speed at the specified teaching point is set to a value which is made smaller in such a manner that the value is gradually reduced from a position which is upstream at a predetermined distance from the specified teaching point.

3. The operation program creating method according to claim 1,
wherein in the speed setting step, the speed at the specified teaching point is set to a value which is made smaller in such a manner that the speed at the specified teaching point is maintained as a speed on a path from the specified teaching point toward a subsequent teaching point, in a range from the specified teaching point to a position which is downstream at a predetermined distance from the specified teaching point.

4. The operation program creating method according to claim 1,
wherein in the speed setting step, at least one teaching point is selected from among the plurality of teaching points, and the speed is set for the selected at least one teaching point.

5. The operation program creating method according to claim 1,
wherein the control device of the robot device is configured to control the robot to cause the robot to perform incremental forming for processing workpieces in such a manner that a rod-like tool attached to the work section of the robot is pressed against the workpieces in succession.

6. A control method of a robot, comprising:
controlling the robot based on the operation program created by the operation program creating method according to claim 1.

* * * * *